June 11, 1968 F. H. BARNETT ET AL 3,387,805
PARACHUTE SUSPENSION SOFT LANDING MEANS
Filed July 13, 1966 4 Sheets-Sheet 1
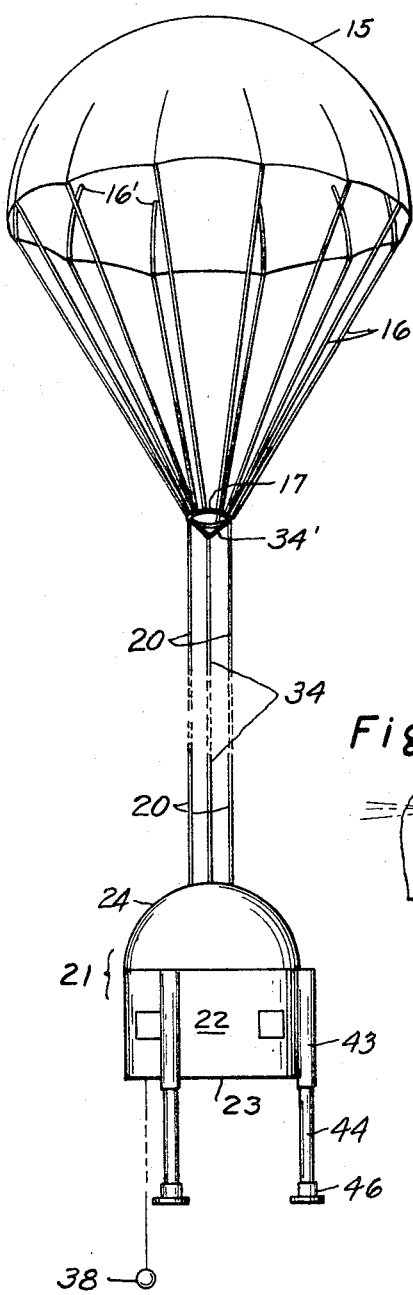
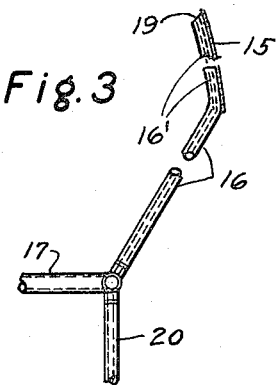
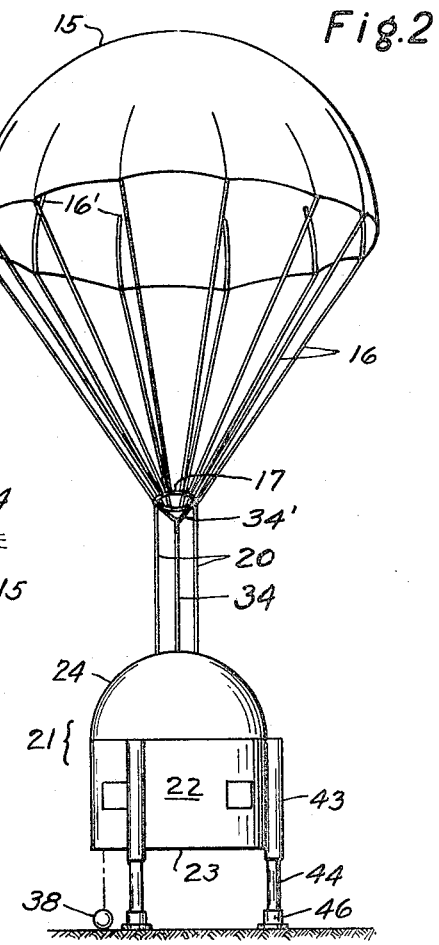
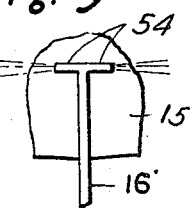
INVENTORS
FOREST H. BARNETT
JAMES W. BARNETT
HENRY J. BARNETT
BY Fred C. Matheny
ATTORNEY

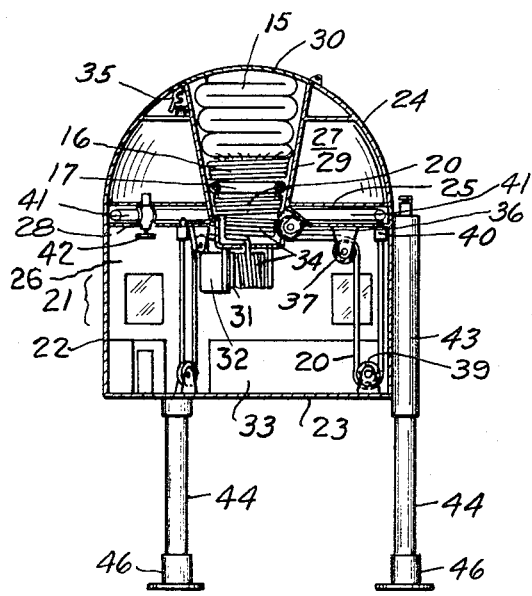
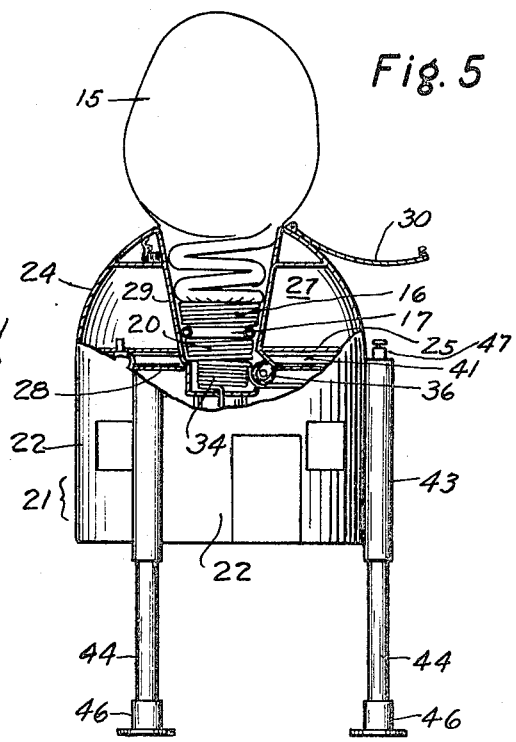
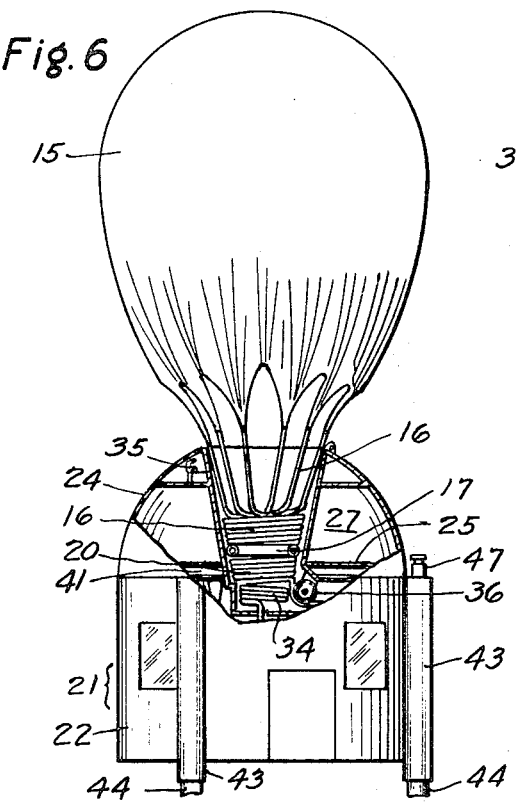
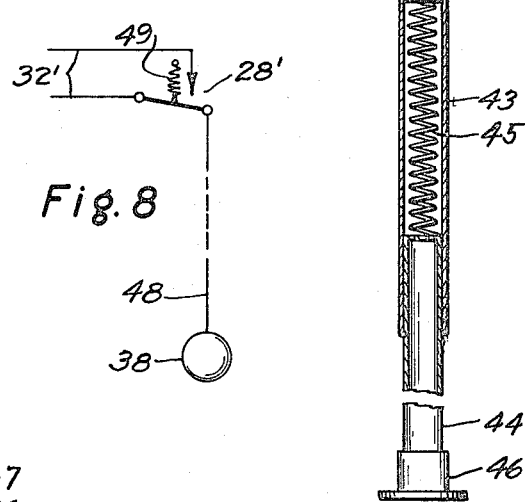

June 11, 1968 F. H. BARNETT ET AL 3,387,805
PARACHUTE SUSPENSION SOFT LANDING MEANS
Filed July 13, 1966 4 Sheets-Sheet 3

INVENTORS
FOREST H. BARNETT
JAMES W. BARNETT
HENRY J. BARNETT
BY Fred C. Matheny
ATTORNEY

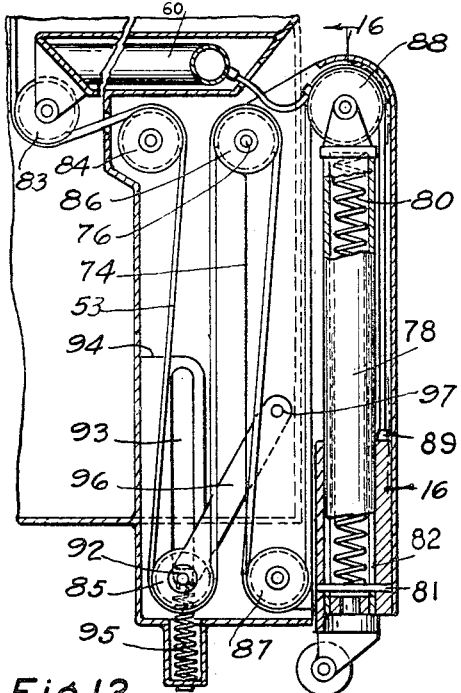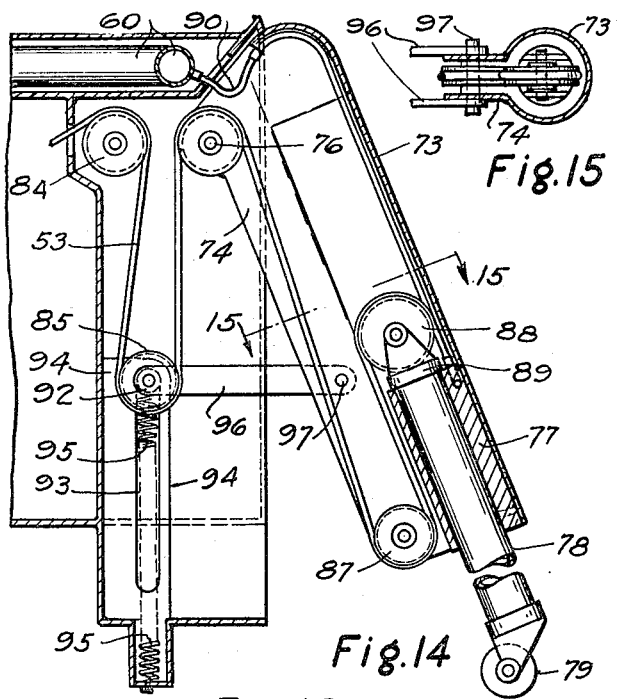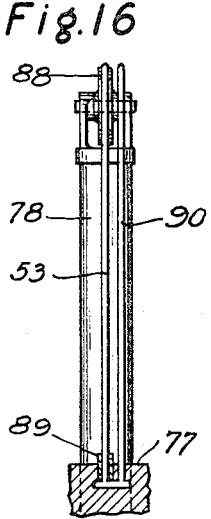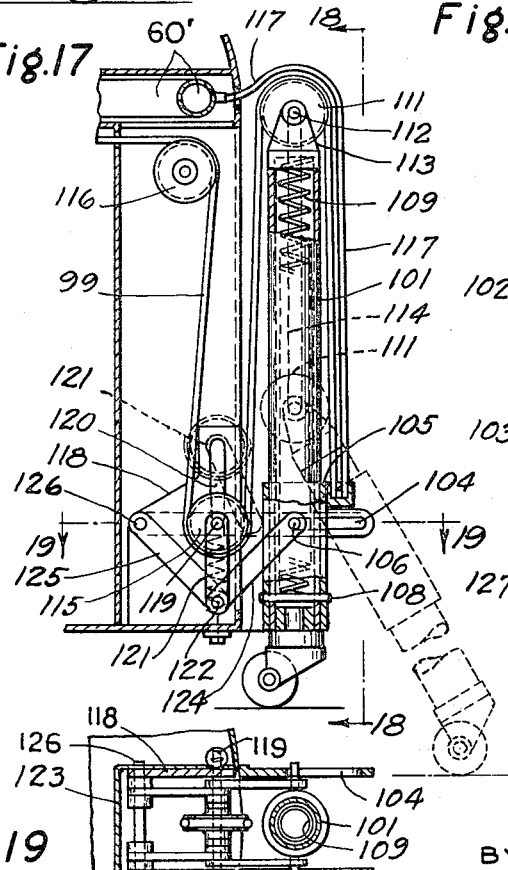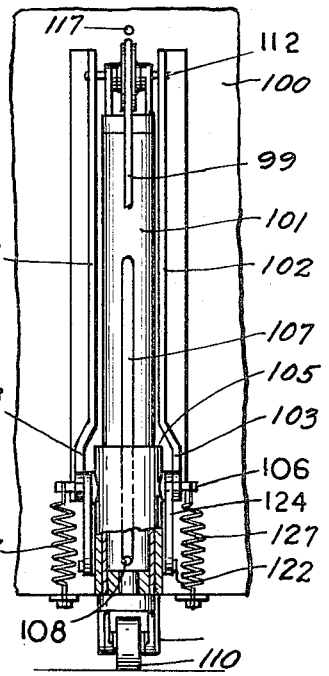

United States Patent Office 3,387,805
Patented June 11, 1968

3,387,805
PARACHUTE SUSPENSION SOFT
LANDING MEANS
Forest H. Barnett, 625 S. Trafton, Tacoma, Wash. 98405, and James W. Barnett and Henry J. Barnett, both of 7702 N. 10th St., Tacoma, Wash. 98407
Filed July 13, 1966, Ser. No. 565,002
11 Claims. (Cl. 244—138)

ABSTRACT OF THE DISCLOSURE

A load carrying housing is suspended from a parachute canopy by highly elastic tubular shroud lines which cushion the shock on the housing in launching and landing. Gas or air under pressure can be delivered through the shroud lines from the housing into the canopy to insure full opening in launching and full spread in landing. Take-up means which will pull the housing upwardly toward the canopy at the time of landing and reduce shock connects the housing and canopy. Ground sensing means hanging below the housing starts operation of the take-up means. Shock absorbing landing legs protrude downwardly from the housing to cushion landings.

---

Our invention relates to shock absorbing parachute suspension and soft landing means of a type used to support a load, such as a parachutist or cargo being lowered by a parachute.

A primary object of our invention is to provide means for reducing the impact and softening the landing of a load supported from a parachute canopy.

Another object is to provide means for greatly reducing the shock to the load upon the opening of the parachute canopy.

Another object is to provide a combination of three elements, namely, elastic load suspension means, take up means for moving the load closer to the parachute canopy, and resilient landing leg means on a load carrying housing or body, all of which cooperate to reduce the velocity and force of impact of the load carrying housing at the instant of landing thus softening the landing.

Another object is to provide parachute load suspension means in which the load is supported from the parachute canopy by a plurality of elastic shroud lines of tubular construction and in which devices are provided for delivering air or gas under pressure through said tubular elastic shroud lines to the inside of a parachute canopy to positively insure the opening of the parachute canopy at the time of launching and obviate the need for a pilot chute, to spread the canopy to its maximum diameter during its descent and particularly at the time of landing, to make possible some guidance control over a descending parachute, and to make it possible to increase the buoyancy of the parachute canopy by filling it with a gas which is lighter than air.

Another object is to provide, in combination with a parachute canopy and tubular elastic shroud lines therefor, a load carrying housing of body having therein a receptacle in which the canopy and shroud lines can be compactly packed in such a manner as to eliminate danger of tangling or fouling when the canopy is released from the housing.

Another object is to provide, in connection with a parachute and load carrying housing having shock absorbing landing legs, a plurality of elastic shroud lines connecting the load carrying housing with the parachute canopy in such a manner as to minimize the transmission of oscillation and side sway from the canopy to the housing thereby greatly increasing the possibility of the housing being in a substantially upright position at the time of landing so that maximum cushioning benefit will be derived from the shock absorbing landing legs when they contact the landing surface.

Another object is to provide swingingly mounted extensible shock absorbing landing legs for a load carrying housing used in parachute drops, which legs are held retracted and parallel to the housing until after the parachute and housing are launched and are then automatically extended and moved to an outwardly inclined position in which they provide a broadened landing support which minimizes the danger of the housing tipping over or being tipped over by the pull of the parachute canopy after the legs contact the landing surface.

Another object is to provide parachute soft landing devices in which a load carrying housing is supported from a parachute canopy by elastic shroud lines and in which said housing has swingingly mounted extensible and retractable shock absorbing landing legs and in which the elastic shroud lines are arranged so they support the landing legs in an extended position at the time of landing and so that the landing legs react against and derive their shock absorbing resiliency from the elastic shroud lines and begin to stretch and tension the elastic shroud lines the instant they contact the landing surface and in which this tensioning of the elastic shroud lines by the retracttion of the landing legs causes the shroud lines to maintain an undiminished pull or load on the parachute canopy until the legs are fully retracted thus reducing the tendency of the canopy to collapse and lose load sustaining capacity at the instant the legs touch the landing surface, as would happen if the shroud lines were relieved of all tension at this instant.

Another object is to minimize the danger that a load carrying housing used in making parachute drops and equipped with shock absorbing landing legs will be tipped over at the time of landing by providing on the lower ends of the landing legs, caster wheels which will roll on, rather than tending to dig into, the landing surface they contact.

Another object is to provide a load carrying housing used in making parachute drops with swingingly mounted air reaction panels which can be adjusted to different selected angles so that air reaction against these panels during a descent can be utilized to provide some guidance control over the descending housing and parachute and can further be utilized to offer some resistance tending to lessen the speed of descent of the housing thereby tending to soften the landing.

Other objects of our invention will be apparent from the following description taken in connection with the accompanying drawings.

In the drawings—

FIGURE 1 is a view in elevation showing a parachute with shroud lines supporting a load carrying housing as they may appear when descending.

FIG. 2 is a similar view showing the same parts immediately after they have made contact with a landing surface and before the parachute canopy has collapsed.

FIG. 3 is a fragmentary view showing parts of the shroud lines and parachute canopy and a fragment of a manifold ring with which the shroud lines are connected.

FIG. 4 is a vertical sectional view, with parts in elevation, showing the load carrying housing with the parachute canopy and shroud lines packed in it.

FIG. 5 is a view similar to FIG. 4 showing the parachute canopy partly ejected from the housing.

FIG. 6 is a view similar to FIG. 5 showing the parachute completely out of the housing and partially open and showing the upper shroud lines partially withdrawn from the housing.

FIG. 7 is a detached view partly in section and partly in elevation showing a shock absorbing landing leg used on the housings shown in the preceding figures.

FIG. 8 is a diagrammatic view illustrating a switch operated by a ground contacting sensing device for closing a circuit to a winding drum.

FIG. 9 is a fragmentary view in elevation showing air pressure discharge nozzle means of modified form designed to equalize the thrust of discharging air.

FIG. 13 is a fragmentary sectional view, on a larger scale than FIG. 11, of the folding extensible landing leg mechanism shown in FIG. 11.

FIG. 14 is a fragmentary view, partly in elevation and partly in section, showing the landing leg mechanism of FIG. 13 in an outwardly inclined extended position.

FIG. 15 is a view partly in elevation and partly in section taken on broken line 15—15 of FIG. 14.

FIG. 16 is a fragmentary elevational view looking in the direction of broken line 16—16 of FIG. 13.

FIG. 17 is a sectional view, with parts in elevation, showing a fragment of a housing and a folding extensible resiliently supported landing leg member different from the one shown in FIGS. 13 to 16.

FIG. 18 is an elevational view taken substantially on broken line 18—18 of FIG. 17.

FIG. 19 is a view in cross section, with parts in plan, taken on broken line 19—19 of FIG. 17.

Like reference numerals refer to like parts throughout the several views.

Figure 10:
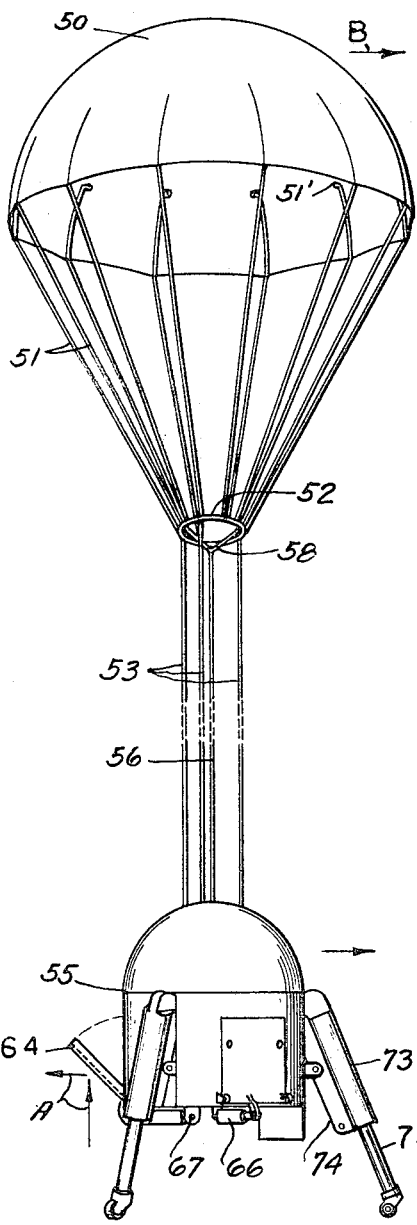
FIG. 10 is an elevational view similar to FIG. 1 showing a load carrying housing of modified form having swingly mounted air reaction sections or panels and having swingingly mounted extensible and retractable shock absorbing landing legs, said legs being shown in an outwardly inclined extended landing position.

Referring to FIGS. 1 to 8 inclusive, 15 indicates a parachute canopy of conventional shape. A plurality of tubular shroud lines 16 of strong pliable highly elastic material are secured in approximately equally spaced apart relation to the peripheral portion of the canopy 15 and, when in use, extend downwardly therefrom in uniformly converging relation and have their lower end portions mechanically and communicatively connected with a manifold ring 17.

The uppermost end portions 16′ of the tubular elastic shroud lines 16, see FIG. 3, can be adhesively secured to the canopy 15 and they terminate in openings 19 through which air or gas under pressure can be discharged. Shroud lines 16 are herein referred to as upper shroud lines. A plurality of lower tubular shroud lines 20 of strong highly elastic material each have one end portion attached to and communicating with the manifold ring 17 and the other end portion extending into and connected, as hereinafter described, with a combined storage and load carrying housing indicated in a general way by numeral 21.

The housing 21 comprises a cylindrical shell 22 having a flat bottom 23 and a spherical top portion 24. Two spaced apart transverse partition members 25 and 28 divide said housing into a lower load carrying compartment 26 and an upper storage compartment which includes an air or gas storage reservoir 27 and an upright upwardly expanding storage compartment 29 for the parachute 15 and shroud lines 16 and 20. The receptacle 29 extends below the partition 28 into the load carrying compartment 26. A cover member 30, which preferably will open by pressure, is provided for the storage receptacle 29. A readily releasable catch member 35 normally holds the cover 30 closed but will release readily when pressure is admitted to the inside of the packed parachute canopy 15. The pressure supplied through the shroud lines is hereinafter referred to as air pressure but it will be understood that it may be the pressure of a gas, which for instance may be lighter than air to provide buoyancy.

A winding drum 31, FIG. 4, is rotatively supported below and in close proximity to the storage receptacle 29 and is adapted to be driven by a motor 32 which can be energized by a battery 33. A non-elastic cable 34 has one end attached to the drum 31 and the other end attached to the manifold ring 17 by load centering connector or bridle means 34′, FIG. 1. The cable 34 extends through a suitable opening in the bottom of the receptacle 29, which opening also serves as a passageway for shroud lines 20. Winding drum 31, motor 32 and cable 34 serve as take-up devices for moving the housing 21 toward the canopy 15. When the parachute canopy 15 and shroud lines 16 and 20 are stored in the receptacle 29 a major portion of the cable 34 is preferably coiled in the lower end of said receptacle 29. When the parachute canopy is ejected and opens this cable 34 and all of the elastic shroud lines 16 and 20 are pulled out, and as long as the motor 32 is not started, the shroud lines take the load between manifold ring 17 and housing 21 and the cable 34 runs out freely. Obviously if the canopy 15 is supporting the housing 21 in the air, as shown in FIG. 1, and the motor 32 is started the winding of the cable 34 on the drum 31 will reduce the distance between the canopy 15 and the housing 21 and when this winding of the cable 34 is caused to occur just prior to the instant of landing of the housing 21 it will reduce the landing velocity and force of impact of said housing and soften the landing. Sensing means capable of being operated by contacting a landing surface is provided to control energizing of the motor 32, as hereinafter explained.

When all of the previously described parts are packed in the receptacle 29 they will occupy the positions illustrated in FIG. 4 with the cable 34 in the bottom of the receptacle 29, the lower shroud lines 20 above and on the cable 34, the manifold ring 17 on the shroud lines 20, the upper shroud lines 16 on the manifold ring 17, and the parachute canopy 15 on the upper shroud lines 16. When thus packed in the upwardly expanding receptacle 29 all of these parts will come out easily and without danger of tangling when air pressure is admitted to the inside of the canopy 15.

Preferably at least three lower tubular elastic shroud lines 20 are provided and the lower end portion of each shroud line 20 extends over three sheaves 36, 37 and 39, FIG. 4, in compartment 26 and has its terminal portion attached by means 40 to the housing 21 and communicatively connected by the same means 40 with a larger tubular manifold ring 41. Ring 41 is disposed between the two partitions 25 and 28. A valve 42 in manifold 41 provides communication between said manifold and reservoir 27 and can be opened by an occupant of housing compartment 26 to admit air pressure by way of manifold 41, shroud lines 20, smaller manifold ring 17 and shroud lines 16 to the inside of parachute canopy 15. The three tubular elastic shroud lines 20 are equally spaced apart angularly and each line is caused by its three sheaves 36, 37 and 39 to pass outwardly toward the periphery of the housing 21 and thence to loop downwardly and back upwardly to the fitting 40. This provides increased length of these shroud lines 20 and because all sheaves roll freely all parts of each line 20 is free to stretch. Making these elastic lines 20 longer helps in minimizing the shock at the time the parachute canopy opens. Also the spreading of these lines in the lower housing compartment 26 tends to make the housing more stable in descent and to minimize side sway.

The sensing means used to close the circuit to motor 32 is shown diagrammatically in FIG. 8. It comprises a switch 28' in the circuit wires 32' which supply current to motor 32. The switch 28' is normally urged closed by a spring 49. The circuit between the battery 33 and wires 32' is normally open and is closed when the parachute opens after the housing and parachute are launched. A weight 38 is connected by a drop line 48 with the switch 28'. When the parachute 15 is ejected from the receptacle 29 the weight 38 and line 48 are released and the weight hangs below the housing 21, as illustrated in FIG. 1, and the switch 28' is opened and held open as long as it is subjected to the pull of the weight 38. When the weight 38 contacts the landing surface the spring 49 instantly closes the switch 28' and energizes the motor 32 and starts to wind the cable 34 on the drum 31. This draws the housing 21 and parachute 15 closer together and helps to reduce the landing speed of the housing 21. Because the weight of the housing is supported by the elastic shroud lines in a substantially balanced condition the cable 34 will be easily wound in, particularly at the beginning of the winding operation and the velocity of the housing will be substantially reduced just before it contacts the landing surface.

The load carrying housing 21 is provided with preferably three resilient shock absorbing landing legs of duplicate construction which are equally spaced around its periphery. These landing legs utilize both spring and air cushioning means for shock absorbing purposes. Each landing leg comprises a normally vertical upper tubular leg member 43 rigidly attached to the wall 22 of the housing 21. A lower leg member 44 is slidably disposed within the upper leg member 43 and a compression spring 45 is disposed within the leg members 43 and 44 and resiliently urges the lower leg member 44 into an extended position. Suitable means, not shown, are provided to limit downward movement of the lower leg member 44 relative to the upper leg member 43. Said lower leg member 44 has, on its bottom end, a foot piece 46 of large enough size so it will not easily sink into ground on which landings will ordinarily be made. The lower leg member 44 fits snugly within the upper leg member 43 and operates like a piston in compressing air for cushioning purposes in the upper leg member 43 as it moves upwardly therein. An adjustable bleeder valve 47 is operatively connected with the upper end of the leg member 43 to regulate or entirely close off the discharge of air from leg 43.

The resilient shock absorbing landing legs cooperate with the tubular elastic shroud lines 16 and 20 and the cable means operable at the time of landing to reduce the distance between the load carrying housing 21 and canopy 15. The elastic shroud lines 16 and 20 support the housing 21 in a balanced condition in which it takes very little applied force to decrease its velocity of descent. This means that the impact of the landing legs when they contact the landing surface, and particularly their applied resistance immediately following this impact will not be as great as it would be if the housing were supported by non-elastic shroud lines and not in this balanced condition of suspension. Because of the elastic support of the housing by the shroud lines the yielding resistance offered by the landing legs will minimize the impact of their contact with the ground and bring about a smooth and even deceleration of the housing. The cushioning effect of both the springs and the air in the landing legs is at a minimum at the time of their contact with the ground and increases uniformly as they take over the load of the housing from the canopy 15 and bring said housing to a gradual stop. The operation of cable 34 in decreasing the downward velocity of the housing just before the legs contact the landing surface also cooperates in increasing the efficiency of the landing legs and elastic shrouds.

Air discharging from the upwardly directed outlet openings 19 of the upper tubular shroud lines 16 will exert some jet force in a generally downward direction. This exertion of a downward force can be overcome and neutralized by making the upper end 54, FIG. 9, of the terminal part 16' of each shroud line 16 of T-shape so that equal amounts of air will discharge in two opposite directions and the thrust of one discharging jet will balance the thrust of the other. If the two air jets illustrated in FIG. 9 are discharged against a curved surface of the canopy 15 they can be caused to exert some directional force thereon to help guide the parachute.

FIGS. 10 to 15 inclusive disclose modified structure in which 50 is a parachute canopy, 51 upper tubular elastic shroud lines, 52 a manifold ring; 53 lower tubular shroud lines, 55 a load carrying housing, and 56 a cable wound on a drum 57 and having its upper end connected by bridle means 58 with the manifold ring 52. All of the parts just hereinbefore mentioned are similar in a general way to the previously described corresponding parts shown in FIGS. 1 to 8. The motor of winding drum 57 is controlled by ground sensing means of the form shown in FIG. 8 and together with the cable 56 serves as take-up means for moving the housing 55 closer to the canopy 50 just prior to landing contact of said housing.

The upper end portion of the shroud lines 51 extend a substantial distance into the canopy 50 and are cemented or otherwise fixedly attached thereto and terminate in discharge tips 51' which point in a direction generally inwardly toward the vertical axis of the canopy when said canopy is in descent. Air under pressure can be discharged from one or more selected groups of these tips 51', as hereinafter explained, to produce an unbalanced jet action or force which will provide some guidance control over the descending parachute and housing.

Figure 10B:
FIG. 10B is a detached plan view illustrating a larger air or gas pressure control manifold ring embodied in the housings shown in FIGS. 10 to 19 inclusive.
Figure 10A:
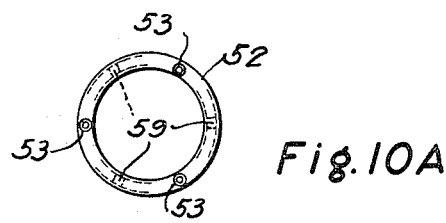
FIG. 10A is a detached plan view illustrating a smaller air or gas pressure control manifold ring used in the forms of our invention shown in FIGS. 10 to 19.

The manifold member 52, see FIG. 10A, is divided by partitions 59 into three separate compartments and one of the lower shroud lines 53 and a group of adjacent upper shroud lines 51 communicate with each of these compartments. The lower tubular shroud lines 53 extend downwardly into the housing 55 and, after passing over sheaves as hereinafter described, are communicatively connected with separate compartments of a manifold ring 60, FIGS. 10B, 11, 13 and 14. Said ring 60 is divided into three independent compartments by partitions 61. Each compartment in the ring 60 is communicatively connected by a valve 62 with a pressure reservoir 63 in the upper end portion of the housing 55. This provides means for independently controlling the supply of air pressure to each compartment of the ring 60. Obviously the three compartments of ring 60 can be separate and independent pressure conduits or chambers. The arrangement of manifold rings 52 and 60, valves 62, and tubular elastic shroud lines 51 and 53 is such as to provide three independently controlled groups of adjacent shroud lines 51 with each group spanning about one third of the distance around the canopy 50. Thus a controlled jet action resulting from the discharge of air under pressure from three different general directions into the canopy is provided and the jet force of this discharging air can be utilized to exert some guidance on the canopy 50 and housing 55 supported by it.

Figure 11:
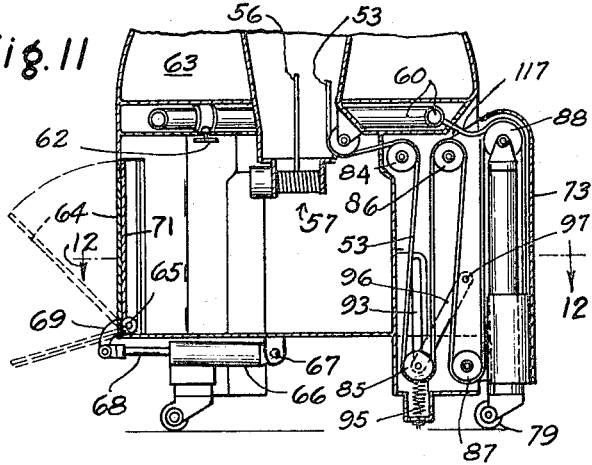
FIG. 11 is a vertical sectional view, with parts in elevation, of the housing shown in FIG. 10, the landing legs being retracted and shown folded parallel to the sides of the housing.
Figure 12:
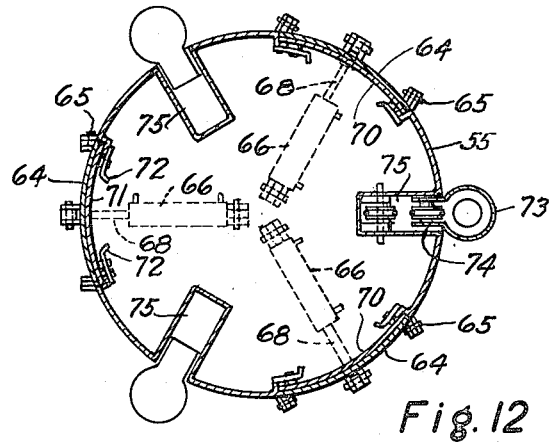
FIG. 12 is a sectional view taken substantially on broken line 12—12 of FIG. 11.

The housing 55, FIGS. 10, 11 and 12, is provided with, preferably three, adjustable wall sections 64 having their lower edges supported by hinges 65 so that one or more of said sections can be swingingly moved outwardly and downwardly to serve as an air reactance member against which air will react during descent of the parachute and housing. A hydraulic cylinder 66 is positioned below housing 55 to adjust each air reactance member 64. Each cylinder 66 is connected by a piston rod 68 and bracket means 69 with the lower end portion of one of the air reactance members 64 and can be used to swingingly adjust the member 64 between a closed position in which member 64 forms part of the outer wall of the housing 55 and an open position in which the member 64 extends at substantially any desired angle from the housing 55. If for instance, one of the reactance members 64, as illustrated in FIG. 10, is positioned so that it extends at an angle in the order of forty-five degrees from the wall of the housing 55, the air through which said housing is descending will react against said member 64, as indicated by arrows A and exert a pressure tending to deflect the housing 55 to the right. Also this air reactance will tend to slow the descent of the housing 55. Obviously one or more of the members 64 can be inclined outwardly at any desired angle. A secondary housing wall 70 rigid with and disposed within the housing 55 is provided in connection with two of the air reactance members 64 shown at upper and lower right, FIG. 12, to close the opening which would otherwise be left in the wall of the housing 55 by the lowering of the adjacent air reactance member 64. Conventional hydraulic pressure supply and control means, not shown, is provided in connection with the hydraulic cylinders 66.

The secondary housing wall 71 which is inside of the third air reactance member 64, shown at the left in FIGS. 11 and 12, is hinged on the same pivots 65 as adjacent member 64 and is provided with latch means 72, not herein shown in detail, whereby it can be latched to the housing 55 to maintain a closed housing when the adjacent air reactance member 64 is being used for guidance purposes or can be unlatched from the housing 55 and lowered together with the adjacent member 64 into an approximately horizontal position to leave an opening for access to the housing 55 and for loading and unloading cargo. An occupant of the housing 55, during a descent, can adjust the air reactance members 64 to exert a guiding force in a predetermined direction on the housing 55 and, at the same time, can cause air to be discharged from a predetermined group of the jet type air discharge nozzles 51' to exert a guiding force in the same direction on the parachute canopy 50. This provides a substantial degree of guidance control over the parachute and its load. In FIG. 10 arrows A and B indicate application of guidance forces to both housing 55 and parachute 50 tending to deflect them to the right.

The housing 55 shown in FIGS. 10 to 14 is provided with three swingingly mounted extensible shock absorbing legs of duplicate construction. Each of these legs comprises an upper tubular leg member 73 having inwardly directed flanges 74 which are received within a well 75, FIG. 12, in the side of the housing 55 and are swingingly supported on a pivot member 76. A cylindrical guide member 77 is fixedly secured within the lowermost end portion of the upper leg member 73. A lower tubular leg member 78 is slidably and retractably supported in the guide member 77. A caster wheel 79 is swingingly mounted on the lower end of the leg member 78. A compression spring 80 within the lower leg member 78 has its lower end supported on a cross pin 81 which is rigid with the guide member 77. Slots 82 in lower leg member 78 permit it to move longitudinally relative to cross pin 81. The upper end of spring 80 reacts against the upper end of lower leg member 78 and normally holds it in the upwardly retracted position in which it is shown in FIG. 13.

A lower tubular elastic shroud line 53 for connection with each leg member extends downwardly into the housing 55, thence outwardly over a sheave 83, thence back and forth in vertical directions over a plurality of other sheaves 84, 85, 86 and 87 and finally extends in a loop of inverted U-shape over a sheave 88 which is mounted on the upper end of the lower leg member 78. The lowermost end part of the shroud line 53 is fixedly secured by a fitting 89 to the tubular guide member 77 which is rigid with upper leg member 73. An air supply tube 90 provides communication between the lower end of the tubular shroud line 53 and the manifold ring 60. The sheave 87 is mounted near the lower end of the upper leg member 73 between the flanges 74 and the run of shroud line 53 between sheaves 87 and 86 is shielded between said flanges 74.

The bearing member 92 of the sheave 85 is guided for vertical movement in a slot 93 in a fixed frame member 94. A tension spring 95 yieldingly urges said sheave 85 into its lowermost position in which it is shown in FIG. 13. Obviously elastic material can be used under tension in place of spring 95. Preferably two links 96, both of which are shown in FIG. 15, each have one end connected by a pivot member 97 with the flanges 74 of upper leg member 73 and their other end connected with bearing member 92 of sheave 85.

In the operation of the landing legs shown in FIGS. 10 to 16 the lower leg members 78 will be retracted and both leg members of each leg folded, as shown in FIG. 13, until after the housing 55 with the parachute therein is launched. After launching and when the parachute opens the weight of the housing 55 and its load will be supported by the lower tubular elastic shroud lines 53. The tensioning of these shroud lines 53 produced by the weight of housing 55 will lift the sheave 85 into the position in which it is shown in FIG. 14 thereby causing the links 96 to swing the entire leg outwardly away from housing 55. This tension of shroud lines 53 will also exert a downward pressure on sheaves 88 and move the lower leg members 78 against the pressure of springs 80 into a downwardly extended position, as illustrated in FIGS. 10 and 14, it being understood that springs 80 are only strong enough to hold the lower leg members retracted when no other force is being exerted on said leg members. The springs 80 exert some cushioning force at the time the parachute opens and thus tend to minimize shock on the housing 55 at this time.

When the caster wheels on the outwardly inclined, extended, shock absorbing legs contact a landing surface further downward movement of the housing 55 is cushioned by a stretching of the elastic shroud lines 53 produced by relative upward movement of the sheaves 88 operating in the inverted U-shaped loops of shroud line. Thus the impact of the legs on the landing surface will be cushioned and the landing softened. The numerous spaced apart sheaves over which the shroud lines 53 pass make possible the use of long shroud lines for more elasticity. Each sheave 88 operates in an inverted U-shaped loop of shroud line which has one end fixed to the upper leg member 73. This means that the stretch in the upper shroud line 53 will be approximately twice the distance of upward movement of the sheave 88 when the lower leg member contacts the landing surface. This tensioning of shroud lines 53 exerts a downward pull on parachute 50 and tends to retard its collapse after the legs touch the landing surface and before downward movement of the housing 55 is stopped.

FIGS. 17, 18 and 19 show a shock absorbing landing leg of further modified form which is similar in construction and mode of operation to the landing leg shown in FIGS. 10 to 16 and is connected with a housing 100 similar to just described housing 55. Said landing leg comprises a tubular leg member 101 disposed between two duplicate upright spaced apart side plates 102. Plates 102 are rigid with the housing 100. Said plates 102 terminate at their lower ends in outwardly offset parts 103 of greater width than the guide plates. The offset parts 103 are respectively provided with normally horizontal slots 104.

A tubular guide sleeve 105 slidably receives the leg member 101. Two oppositely protruding pins 106 are rigid with sleeve 105 and are slidably disposed in the slots 104. This supports the guide sleeve 105 for tilting movement and for movement toward and away from the housing 100. The leg member 101 is provided with two diametrically opposite longitudinally extending slots 107 and a cross pin 108 extends transversely through and is rigid with the lower end portion of the guide sleeve 105 and extends through the slots 107 thereby permitting longitudinal movement of the leg member 101. Said pin 108 serves as a spring support for a compression spring 109 in leg member 101. Spring 109 yieldingly urges leg member 101 upwardly with enough force to hold said leg member 101 retracted except during landing operations. A caster wheel 110 is provided on the lower end of leg member 101.

A sheave 111 is mounted by a pin 112 between two bracket ears 113 which are rigid with the upper end of leg member 101. Protruding end portions of the pin 112 extend into and are guided for normally vertical movement in upright slots 114 in the guide plates 102. Slots 114 are shown by dotted lines in FIG. 17. A tubular elastic lower shroud line 99, similar to shroud line 53, passes in a loop of inverted U-shape over said sheave 111. The outer end of shroud line 99 is fixedly attached to the tubular sleeve 105. An air pressure supply conduit 117 communicatively connects the terminal part of shroud line 99 with a manifold air pressure supply ring 60'. Inwardly from the sheave 111 the shroud line 99 extends downwardly and around a lower sheave 115, thence upwardly and over an upper sheave 116 and thence toward center and upwardly out of the housing 100.

The lower sheave 115 is positioned between two guide plates 118 which are disposed within and are rigid with the housing 100. Said sheave 115 has a relatively long bearing pin 119 which protrudes in both directions from sheave 115 and is guided for vertical movement in upright slots 120 in the guide plates 118. Sheaves 115 and 116 and parts connected therewith operate in an indented receptacle 123 in the housing 100. Two upright links 121 at opposite sides of sheave 115 connect the bearing pin 119 with a common pivot 122 of the adjoining ends of two toggle links 124 and 125 which form a pair. Preferably two pairs of these toggle links are provided. The outer end of one toggle link 124 of each pair is connected with the adjacent pivot stud 106 on the guide sleeve 105. The outer end of the other link 125 of each pair is connected by a pivot 126 with the adjacent frame plate 118. Tension springs 127 are connected between the ends of the bearing pin 119 of lower sheave 115 and the bottom of the housing 100 and urge the sheave 115 and toggle links 124 and 125 together with sleeve 105 and leg 101 into the folded position in which they are shown by full lines.

In the operation of the landing leg devices shown in FIGS. 17, 18 and 19, when the shroud line 99 is not under tension the spring 109 will hold the leg 101 in its uppermost position alongside of the housing 100 and the springs 127 will hold said leg close to said housing 100. When the housing 100 is launched in the air and the parachute is ejected and opens the shroud line 99 will be tensioned by the weight of the housing 100. The initial tensioning of shroud line 99 will lift sheave 115 to the upper limit of its movement and in so doing will align the toggle links 124 and 125 and move the lower end portion of leg 101 and its sleeve 105 outwardly so that the pins 106 will be at or near the ends of the slots 104. When upward movement of sheave 115 is stopped by engagement of bearing pin 119 with the ends of slots 120 the downward pull of the inverted U-shaped shroud line loops on the sheave 111 will overcome the pressure of the spring 109 and move the leg 101 downwardly through the sleeve 105. This will also swingingly move said leg 101 outwardly to provide a broadened landing support. Since the compression of spring 109 occurs at the time of launching and at the time the parachute begins to exert restraint on the housing it will be apparent that this spring 109 helps some in cushioning the shock resulting from opening of the parachute.

Downward movement of leg 101 will be stopped when pin 112 engages the lower end of slots 114 in guide plates 102. When the outwardly inclined lowered legs 101 contact a landing surface further descent of housing 101 will be cushioned by stretching of the shroud lines 99 caused by relative upward movement of legs 101 and sheaves 111. Springs 107, after being compressed by the lowering of legs 101, exert their force in an upward direction at the time of landing and this further tends to stretch the shroud lines 99 and helps in softening the landing of the housing 100.

The foregoing description and accompanying drawings disclose preferred embodiments of our invention but it will be understood that this disclosure is merely illustrative and that changes may be made within the scope of the following claims.

We claim:

1. In shock absorbing parachute suspension and soft landing means, a parachute canopy; a load carrying housing provided with an upper air and gas pressure storage compartment and a lower load carrying compartment; a plurality of tubular shroud lines of strong pliable highly elastic material connecting said parachute canopy and said load carrying housing and providing conduits therebetween; an upright centrally positioned upwardly expanding receptacle extending from the upper end of said housing downwardly to the load carrying compartment and adapted to receive the parachute canopy and shroud lines; and gas pressure supply means operable to deliver gas under pressure through said tubular elastic shroud lines into said parachute canopy.

2. The apparatus as claimed in claim 1 in which the tubular elastic shroud lines are spaced at intervals around the parachute canopy and have upper end portions which are secured to the marginal portions of the canopy and extend from the margin of the canopy inwardly and have discharge openings spaced a substantial distance inwardly from the margin of the canopy, whereby the gas is delivered into the central portion of the canopy.

3. The apparatus as claimed in claim 1 in which a gas distributing manifold member is interposed between the shroud lines and the load carrying housing and in which the shroud lines converge downwardly and are attached to and communicate with the manifold member and in which the load carrying housing and gas pressure supply housing are supported from the manifold member and the gas pressure supply means communicates with the manifold member.

4. The apparatus as claimed in claim 1 in which take-up devices operable to reduce the distance between the load carrying housing and the parachute canopy are provided between the load carrying housing and canopy.

5. The apparatus as claimed in claim 1 in which take-up devices operable to reduce the distance between the load carrying housing and the parachute canopy are provided in connection with the load carrying housing and canopy; and sensing means suspended from and hanging below the load carrying housing is connected with and controls the operation of said take-up devices and is actuated by contact with a landing surface to render said take-up devices operable and reduce the distance between the load carrying housing and the parachute canopy.

6. The apparatus as claimed in claim 1 in which the load carrying housing is suspended in a substantially balanced condition by the elastic shroud lines and in which a plurality of resilient shock absorbing landing legs are attached to and extend downwardly a substantial distance below the load carrying housing, whereby they will contact a landing surface and cushion the landing of said load carrying housing.

7. The apparatus as claimed in claim 1 in which a plurality of resilient shock absorbing landing legs are provided on and attached to and adapted to extend downwardly from the load carrying housing; and take-up devices operable to reduce the distance between the load carrying housing and the parachute canopy are provided in connection with the load carrying housing and canopy; and sensing means including parts suspended from and hanging below the load carrying housing is connected with and controls the operation of said take-up devices and is actuated by contact with a landing surface as the load carrying housing approaches said landing surface to render said take-up devices operative and reduce the speed of descent of said load carrying housing by reducing the distance between the load carrying housing and the parachute canopy.

8. Shock absorbing parachute suspension and soft landing means comprising a parachute canopy; a load carrying housing; a plurality of shock absorbing landing legs secured to the marginal portion of said housing, at least a portion of each landing leg being extensible downwardly relative to the housing to protrude below the housing; yieldable means operable to hold the extensible part of each landing leg in an upwardly retracted position; a sheave mounted on the upper end portion of each extensible landing leg part; a plurality of elastic shroud lines connected with said parachute canopy and extending into the axial portion of said housing supporting the housing from the canopy during parachute landings; and a set of guide sheaves mounted in the housing in connection with each landing leg and positioned to guide one of said elastic shroud lines outwardly and downwardly and in a loop of inverted U-shape upwardly over the sheave on the upper end portion of the extensible landing leg part, whereby when the housing is suspended from the canopy the elastic shroud lines will urge the extensible landing leg parts downwardly and whereby an upward force will be exerted through the shroud lines on the housing by the extensible landing leg parts when they contact a solid landing surface.

9. The apparatus as claimed in claim 8 in which at least the extensible part of each landing leg has a pivotal connection with said housing; and in which means are provided for swingingly moving the lower end portion of the pivotally connected landing leg part outwardly in providing a broadened landing support.

10. The apparatus as claimed in claim 8 in which one end of each elastic shroud line loop of inverted U-shape is secured to a non-extensible part of the landing leg, whereby stretching of the shroud line in response to a predetermined amount of retractile movement of the extensible landing leg part is substantially double the amount of said retractile movement; and in which one of the sheaves over which the shroud line passes is guided for vertical movement and movable upwardly by tensioning of the shroud line and in which each landing leg has a pivotal connection with the housing and link mechanism is provided between said vertically movable sheave and the landing leg, said link mechanism operating to swingingly move the landing leg outwardly in response to upward movement of said vertically movable sheave.

11. In shock absorbing parachute suspension and soft landing means, a parachute canopy; load carrying means; a plurality of tubular shroud lines of strong pliable highly elastic material connecting the peripheral portion of said parachute canopy and said load carrying means and providing conduits therebetween; gas pressure supply means operable to deliver gas under pressure through said tubular elastic shroud lines into said parachute canopy; gas pressure discharge openings in the inner ends of the tubular elastic shroud lines, said openings being directed inwardly approximately toward the axis of the canopy when it is open; and independently controlled gas pressure supply means provided for groups of adjacent shroud lines positioned in different segments around said canopy, whereby when gas under pressure is supplied to the group of shroud lines in at least one selected segment and is shut off from the group of shroud lines in at least one other segment the jet action of the discharging gas from the group in the selected segment will be exerted as a transverse direction controlling force on the parachute.

References Cited

UNITED STATES PATENTS

| | | | |
|---|---|---|---|
| 2,418,456 | 4/1947 | Boland | 244—142 |
| 2,477,907 | 8/1949 | Smith | 244—138 |
| 2,525,844 | 10/1950 | Weaver | 244—87 X |
| 2,551,665 | 5/1951 | Geisse | 244—104 |
| 3,175,789 | 3/1965 | Blumrich | 244—138 X |

FOREIGN PATENTS 371,692  10/1963  Switzerland.

OTHER REFERENCES

"Firing Troops Through Space," in Life, Nov. 5, 1956, page 120.

MILTON BUCHLER, *Primary Examiner.*

R. A. DORNON, *Assistant Examiner.*